July 8, 1924.  1,500,760
B. H. HOWARD ET AL
FEEDER FOR INGOT MOLDS
Filed April 24, 1924
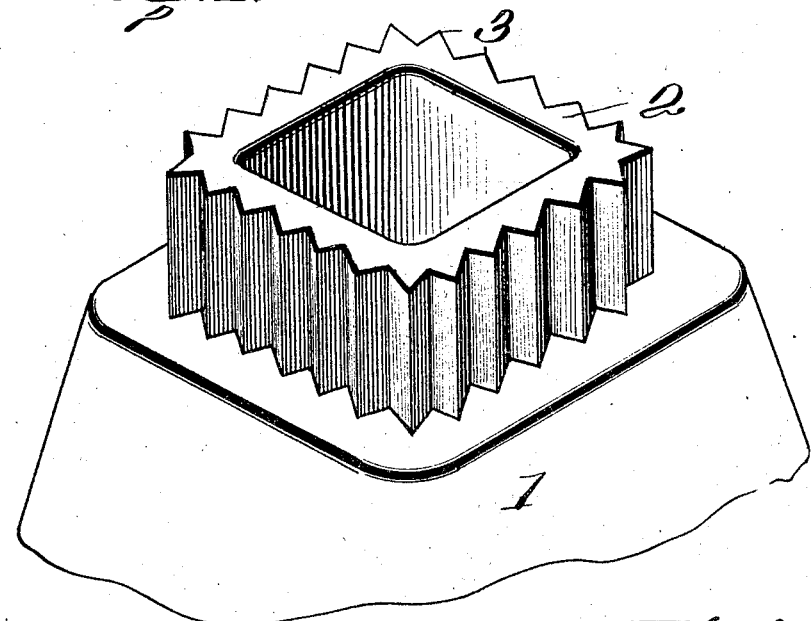
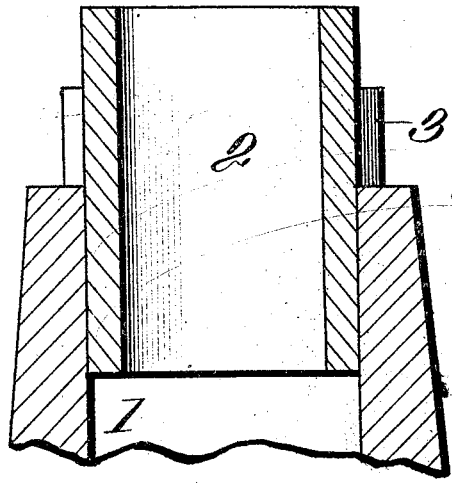
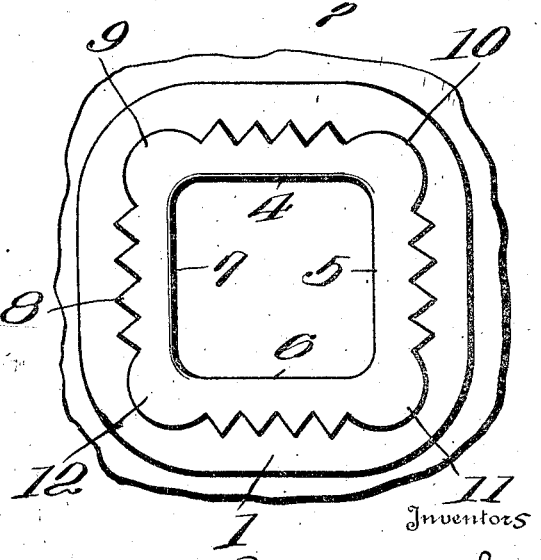

Patented July 8, 1924.

1,500,760

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed April 24, 1924. Serial No. 708,682.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds made of refractory material adapted to be readily inserted into and supported on the upper end of the mold and at the same time provide a feeder which retains the heat at the upper end of the mold to prevent the formation of what is known as "piping" and reduce "segregation."

Another object of our invention is to provide a feeder for ingot molds having means whereby it is firmly supported on the upper end of the mold and the said supporting means serving as strengthening means for the feeder and also to retain heat at the upper end of the mold.

A further object of our invention is to provide a reversible feeder in which the necessary strength is obtained and the necessary amount of material is provided for retaining the heat, yet reducing the amount of material used in a feeder of this character and at the same time to provide a simple, cheap and effective feeder having certain details of structure and combination of parts hereinafter more fully set forth.

In the accompanying drawings:—

Figure 1 is a perspective view of our improved feeder applied to a mold.

Figure 2 is a vertical transverse sectional view of Figure 1, showing a reversible feeder.

Figure 3 is a top plan view of a modified form of feeder.

In the accompanying drawings 1 represents the mold and 2 the feeder. The feeder as shown is of a rectangular form to correspond with the shape of the mold and is provided on its outer periphery with the vertically disposed ribs 3 arranged close together whereby the necessary strength is obtained and at the same time providing sufficient material at the upper end of the mold to retain the heat to prevent the rapid cooling of the upper end of the ingot and thus prevent "piping" and reduce "segregation." These ribs 3 as shown are close together which greatly strengthen the feeder and also serve as supporting means for holding the feeder upon the upper end of the mold.

In the modification shown in Figure 3 we have shown the four walls 4, 5, 6 and 7 of a rectangular feeder provided on their outer faces with the vertically disposed ribs 8. The corners of the rectangular feeder are provided with the enlarged semi-circular ribs 9, 10, 11 and 12 which greatly strengthen that portion of the feeder subjected to the greatest strain. While we have shown the ribs 3 and 8 wedge shaped in horizontal section it will be understood that the shape of the same could be varied without departing from our invention.

Having thus fully described our invention what we claim is:

1. A feeder for ingot molds comprising a body portion having a large number of vertically disposed ribs on its outer face.

2. A feeder for ingot molds comprising a body portion made of refractory material having its outer face provided with vertically disposed connected ribs.

3. A feeder for ingot molds comprising a body portion made of refractory material having intermediate its ends a series of vertically disposed ribs extending entirely around the outer face of the feeder.

4. A feeder for ingot molds comprising a body portion having adjoining ribs carried by its outer face intermediate its ends and extending entirely around the feeder.

5. A feeder for ingot molds comprising a body portion having a portion of its outer face provided with vertically disposed connected ribs extending entirely around the face of the feeder.

6. A feeder for ingot molds comprising a body portion made of refractory material having vertically disposed ribs arranged on opposite sides and connected by larger ribs.

7. A feeder for ingot molds comprising a body portion having a series of connected ribs extending entirely around the same.

8. A feeder for ingot molds comprising a body portion having a shoulder therearound and said shoulder having vertically disposed grooves therein.

In testimony whereof we affix our signatures.

BLOOMFIELD H. HOWARD.
ERNEST J. TURNER.